United States Patent

[11] 3,628,731

| [72] | Inventor | William N. Phillips |
| | | Auburndale, Fla. |
| [21] | Appl. No. | 887,866 |
| [22] | Filed | Dec. 24, 1969 |
| [45] | Patented | Dec. 21, 1971 |
| [73] | Assignee | LECO, Inc. |
| | | Lakeland, Fla. |

[54] CONSTANT SPEED DRIVE MEANS FOR IRRIGATION MACHINES
1 Claim, 19 Drawing Figs.

[52] U.S. Cl. ................................................ 239/189, 239/191
[51] Int. Cl. ........................................................ B05b 3/00
[50] Field of Search ................................................ 239/188, 189, 190, 191, 192, 198, 199, 166, 167, 2; 242/47.08, 47.09, 47.01, 47.12

[56] References Cited
UNITED STATES PATENTS

| 1,658,202 | 8/1928 | Jones | 239/189 X |
| 2,773,587 | 12/1956 | Middleditch, Jr. | 242/47.09 X |
| 3,477,643 | 11/1969 | Bruninga | 239/189 X |
| 3,489,352 | 1/1970 | Diggs | 239/189 |
| 3,507,336 | 4/1970 | Nelson | 239/191 X |
| 3,515,350 | 6/1970 | Kruse et al. | 239/189 |

FOREIGN PATENTS

| 154,283 | 11/1953 | Australia | 239/167 |

*Primary Examiner*—M. Henson Wood, Jr.
*Assistant Examiner*—John J. Love
*Attorneys*—A. Yates Dowell and A. Yates Dowell, Jr.

ABSTRACT: A self-propelled irrigation machine which receives and discharges water under pressure over an extended area, the machine carrying a driving winch and a cable one end of which is secured in place at a remote location and the other end caused to be wound about the winch resulting in the vehicle travelling in a straight line unattended a prescribed distance.

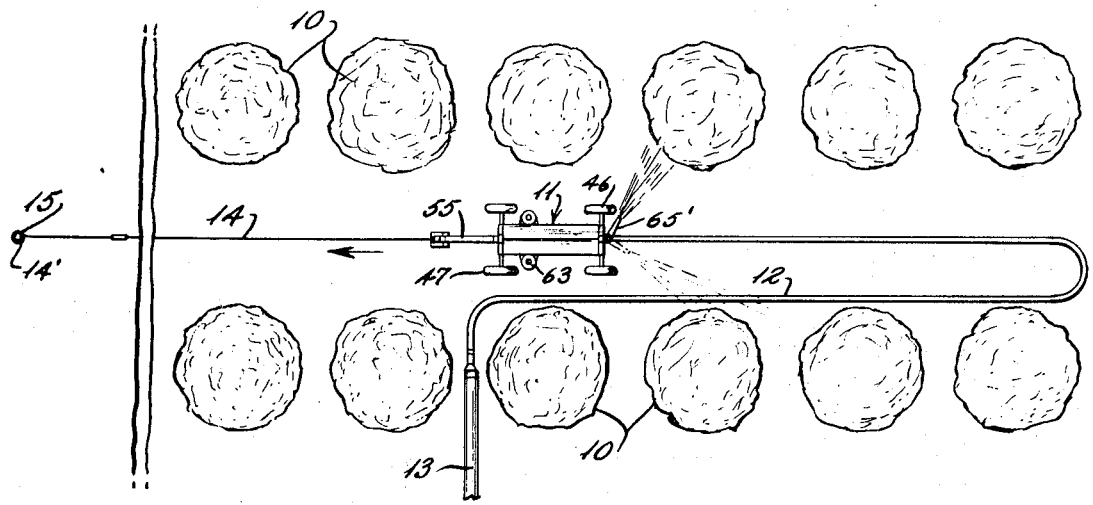
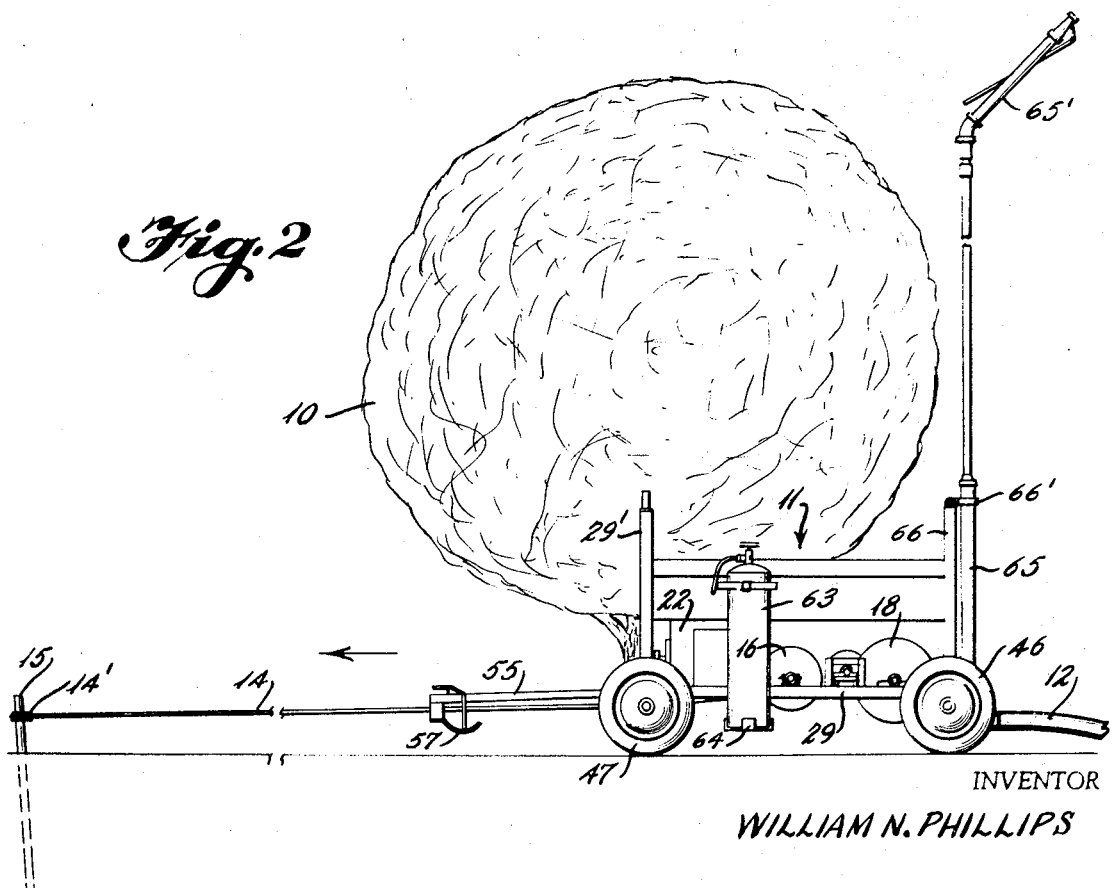

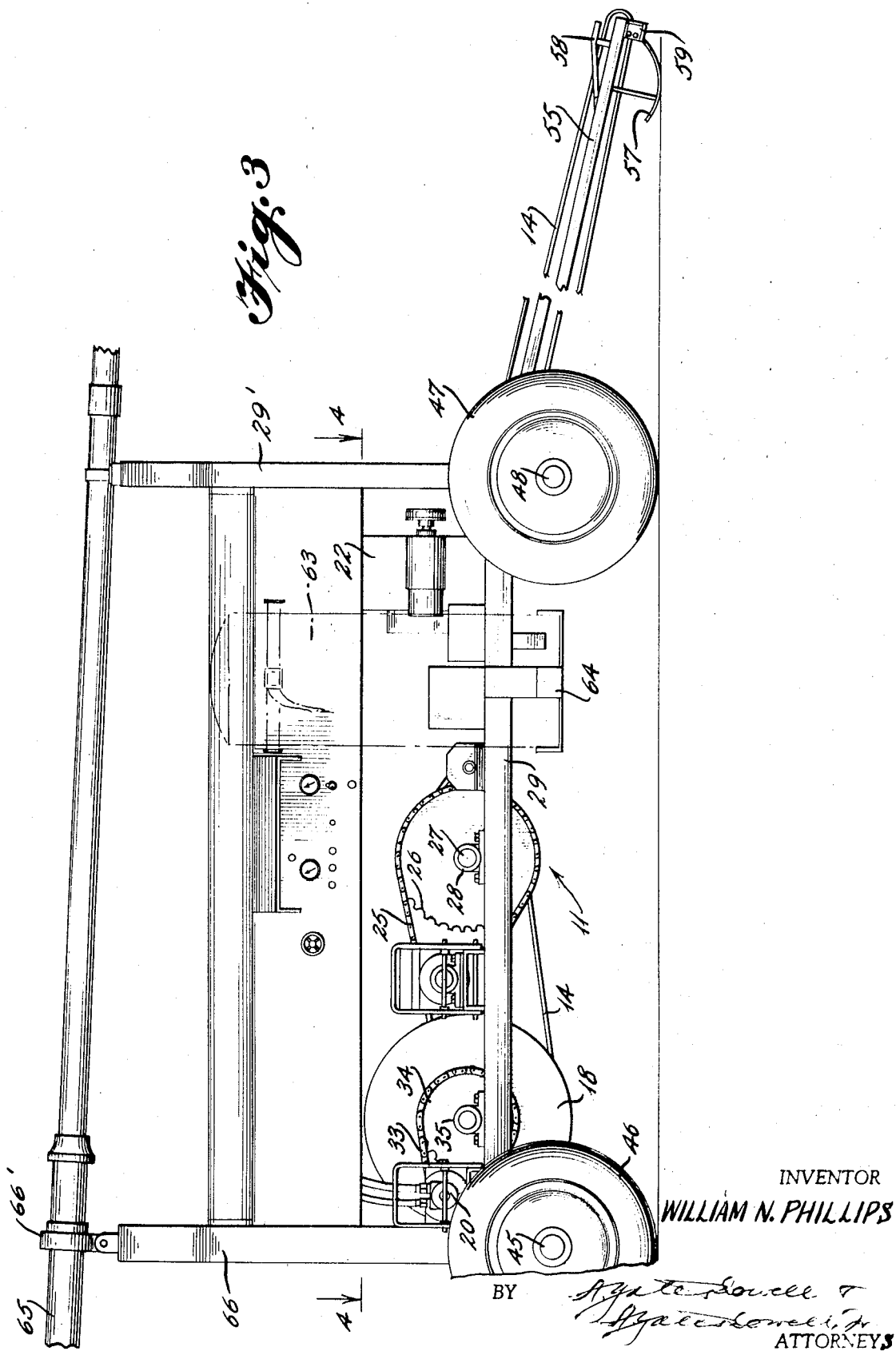

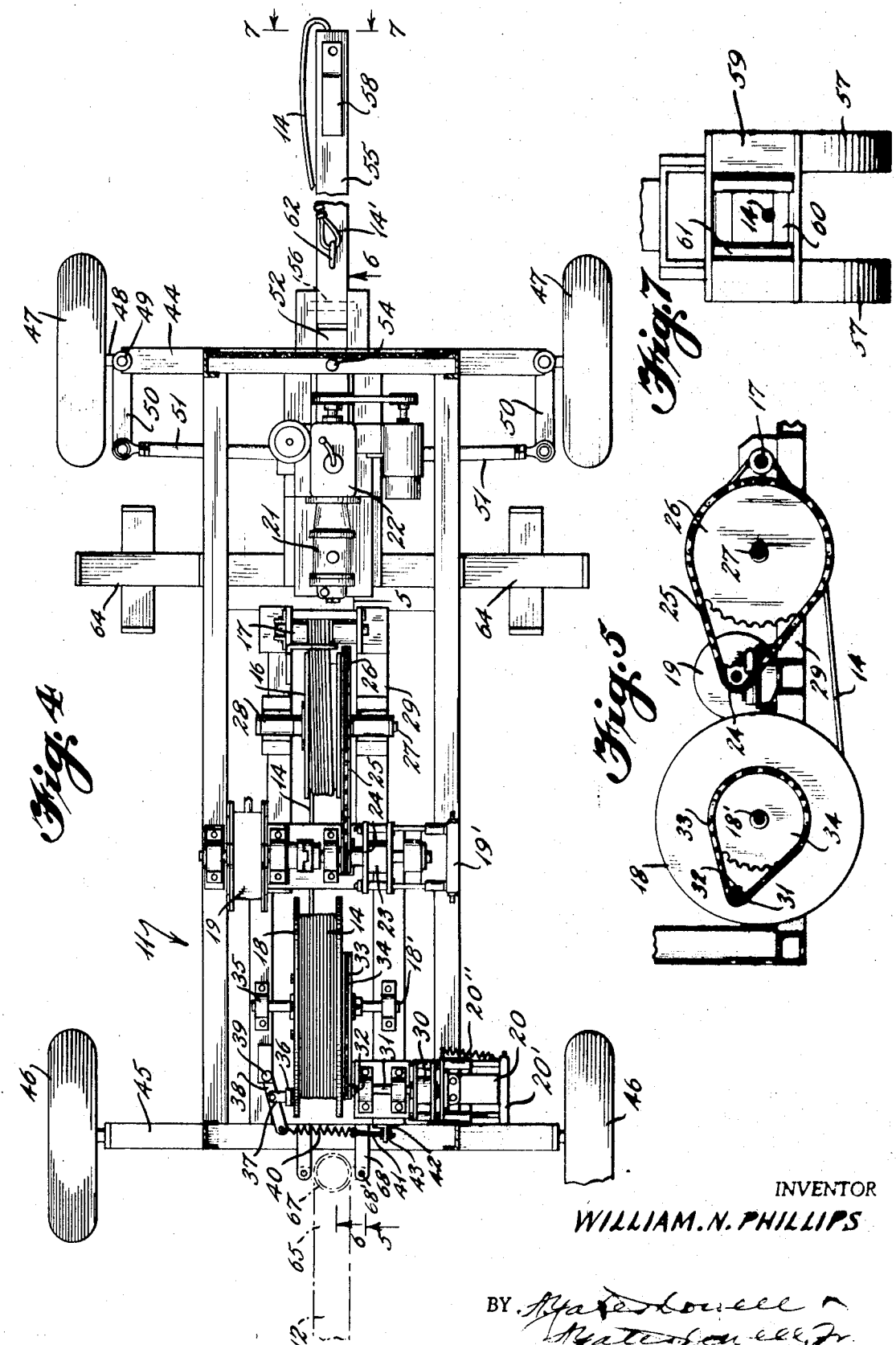

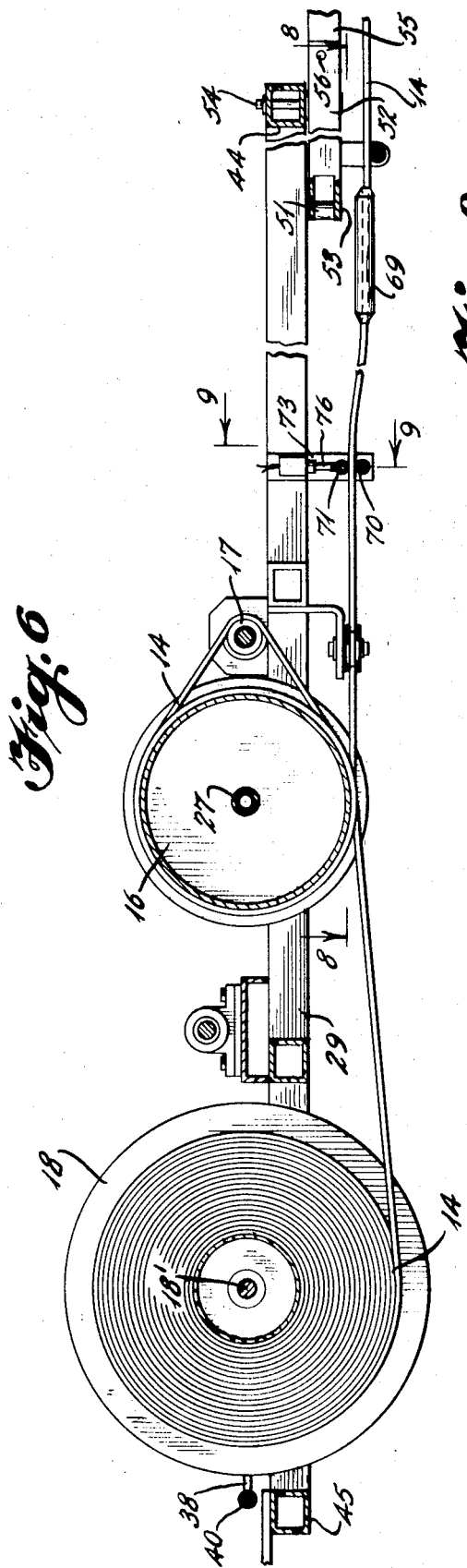
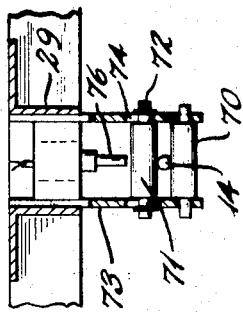

INVENTOR
WILLIAM N. PHILLIPS

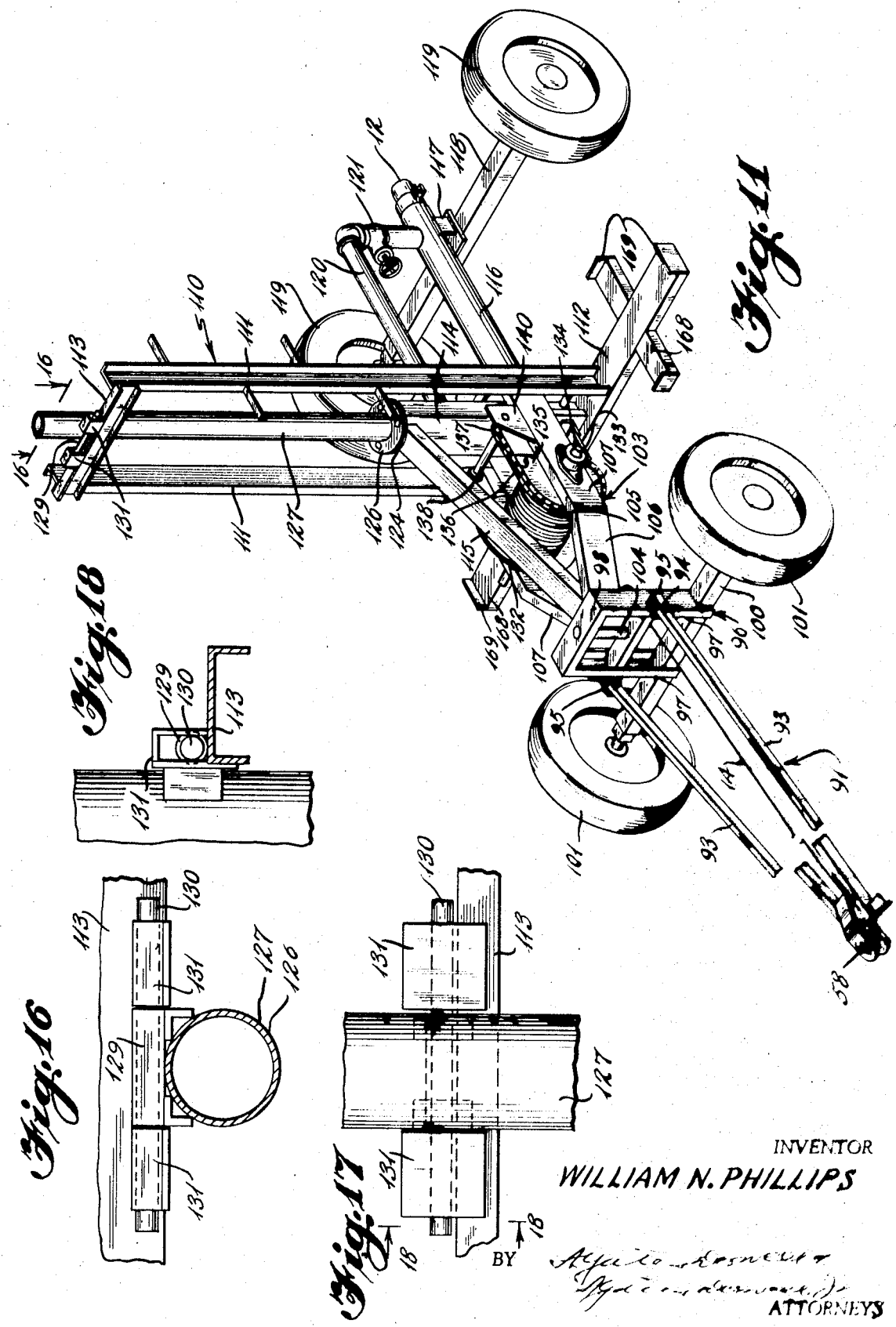

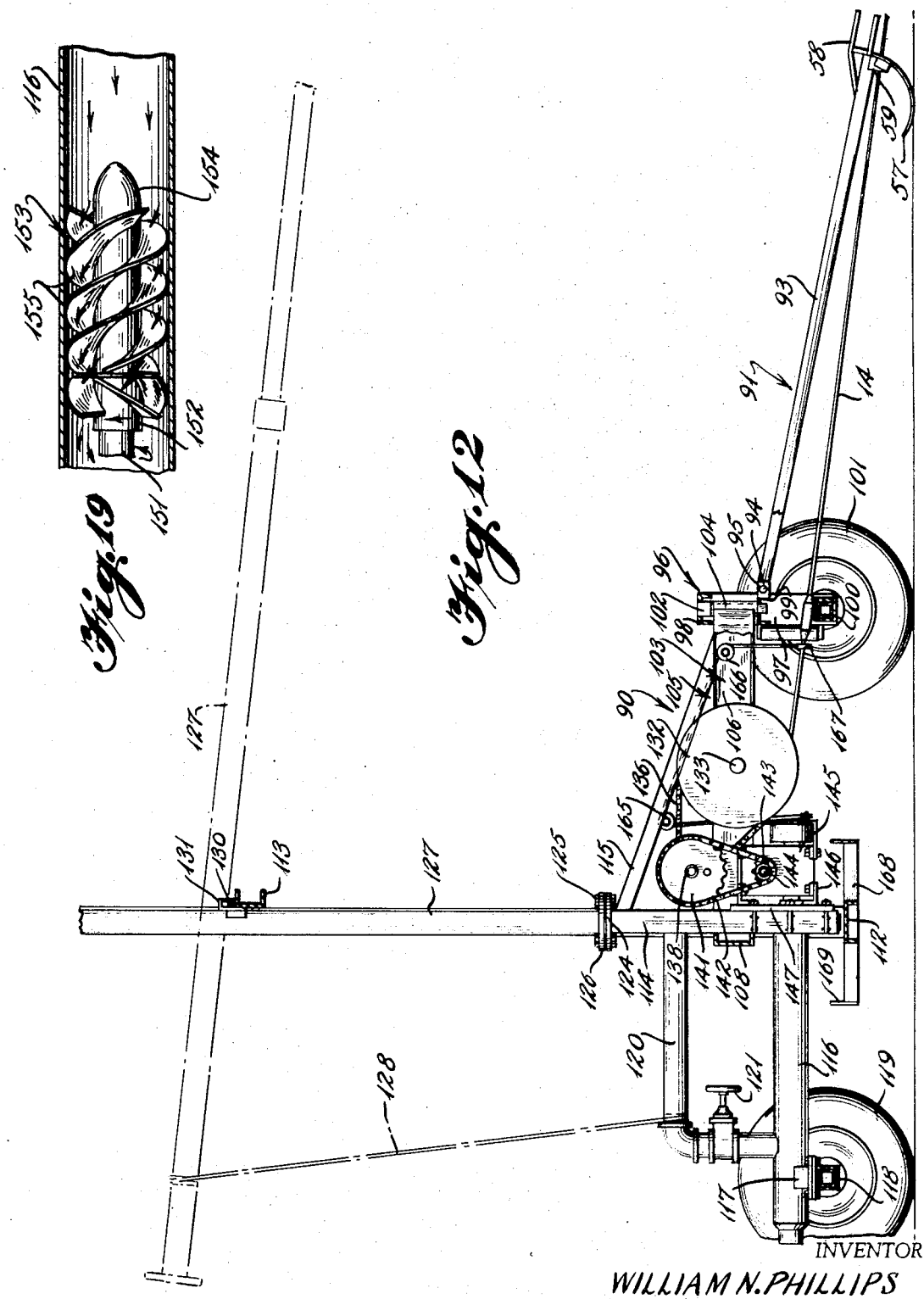

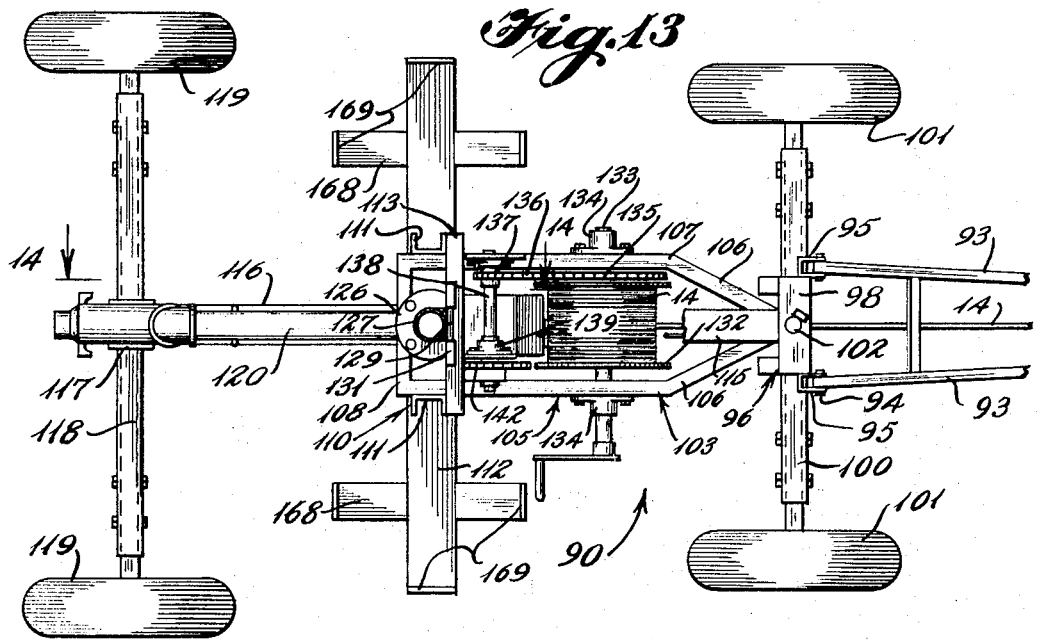
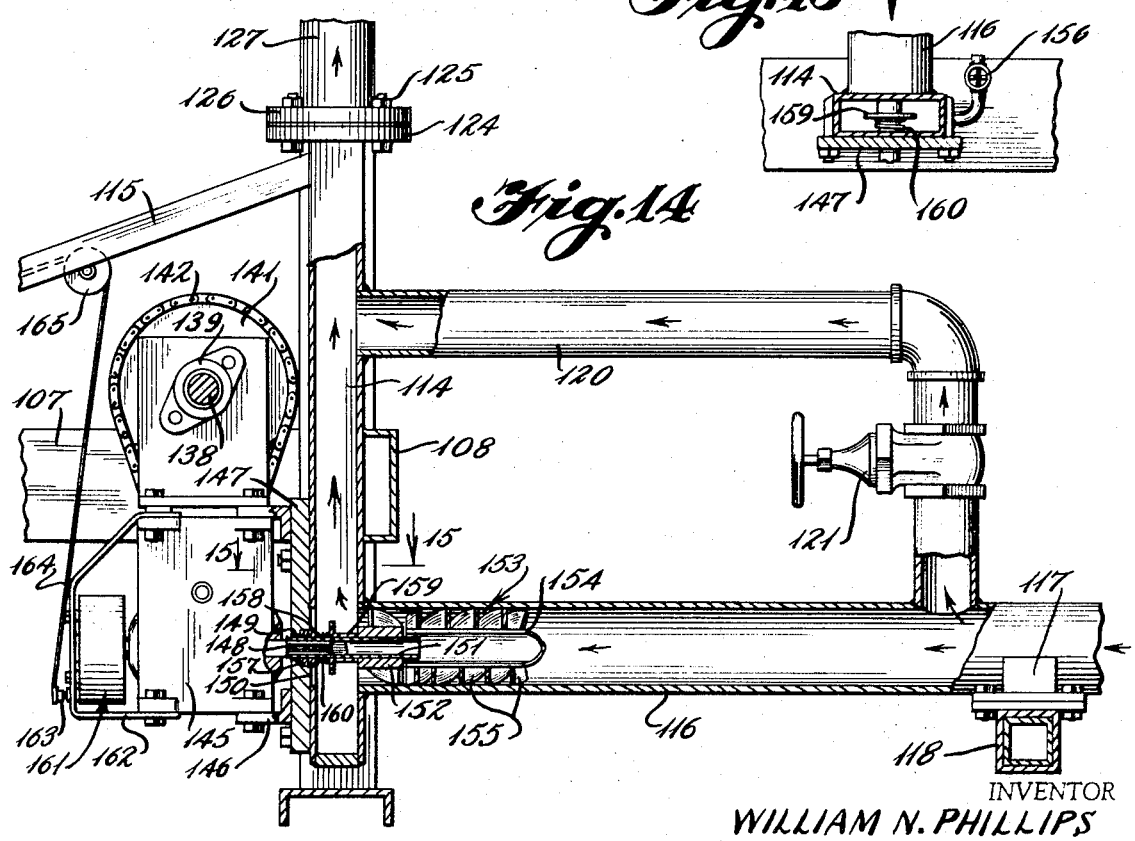
INVENTOR
WILLIAM N. PHILLIPS

CONSTANT SPEED DRIVE MEANS FOR IRRIGATION MACHINES

BACKGROUND OF THE INVENTION

1. Field of the Invention

The invention is in the field of irrigation, particularly of large areas requiring the movement of the machine and the supplying of water to plants or for other purposes.

2. Description of the Prior Art

Vehicular machines have been provided and caused to travel by the winding of a cable on a drum and driven by the water and by engines or other motivation. However, these have not been adequate or satisfactory, or were unreliable or inefficient; for example, the patent to Crepeau, U.S. Pat. No. 485,532 of 1892 and Turner, U.S. Pat. No. 2,122,596.

SUMMARY OF THE INVENTION AND OBJECTS

The invention is a vehicle-mounted irrigation machine having sprinkler mechanism as well as advancing mechanism, and with connection of the sprinkler mechanism to a source of water, and the advancing mechanism including a winch operated in a manner to cause the winding of one end of a cable about the same, the other end of which cable is secured in place at a distance ahead of the vehicle. The invention also includes mechanism for stopping the machine when the water pressure drops below a predetermined value and mechanism near the anchored end of the cable which when the vehicle reaches the same, acts to shut off the advancing and sprinkling mechanism.

It is an object of the invention to provide a mobile self-propelled sprinkling mechanism for receiving water and distributing the same while travelling unattended, and which machine will efficiently perform the necessary and desired irrigating function, as well as a machine which is reliable in operation, will operate effectively and cease operation including shutting off of the water and the power that drives the machine when the water pressure drops below a predetermined value and terminating the travel of the machine after it has moved a predetermined distance which has been previously selectively determined by the operator.

BRIEF DESCRIPTION OF THE DRAWINGS

FIG. 1 is a plan view of the invention in use;

FIG. 2, an enlarged side elevation thereof;

FIG. 3, an enlarged side elevation viewed from the opposite side of that in FIG. 2;

FIG. 4, a horizontal section on the line 4—4 of FIG. 3;

Fig. 5, a vertical section on the line 5—5 of FIG. 4;

FIG. 6, an enlarged vertical section on the line 6—6 of FIG. 4;

FIG. 7, a front end view of the guide tongue;

FIG. 8, a horizontal section on the line 8—8 of FIG. 6;

FIG. 9, an enlarged transverse section on the line 9—9 of FIG. 6;

FIG. 11, a perspective of a modified form of the invention;

FIG. 12, a side elevation viewed from the opposite side of that in FIG. 11;

FIG. 13, a top plan view;

FIG. 14, an enlarged vertical section on the line 14—14 of FIG. 13;

FIG. 15, a horizontal section on the line 15—15 of FIG. 14;

FIG. 16, an enlarged fragmentary section on the line 16—16 of FIG. 11;

FIG. 17, a side elevation of the structure of FIG. 16;

FIG. 18, a section on the line 18—18 of FIG. 17; and

FIG. 19, an enlarged fragmentary section of the standpipe and diagrammatically illustrating the flow of water.

DESCRIPTION OF THE PREFERRED EMBODIMENTS

Figure 10:
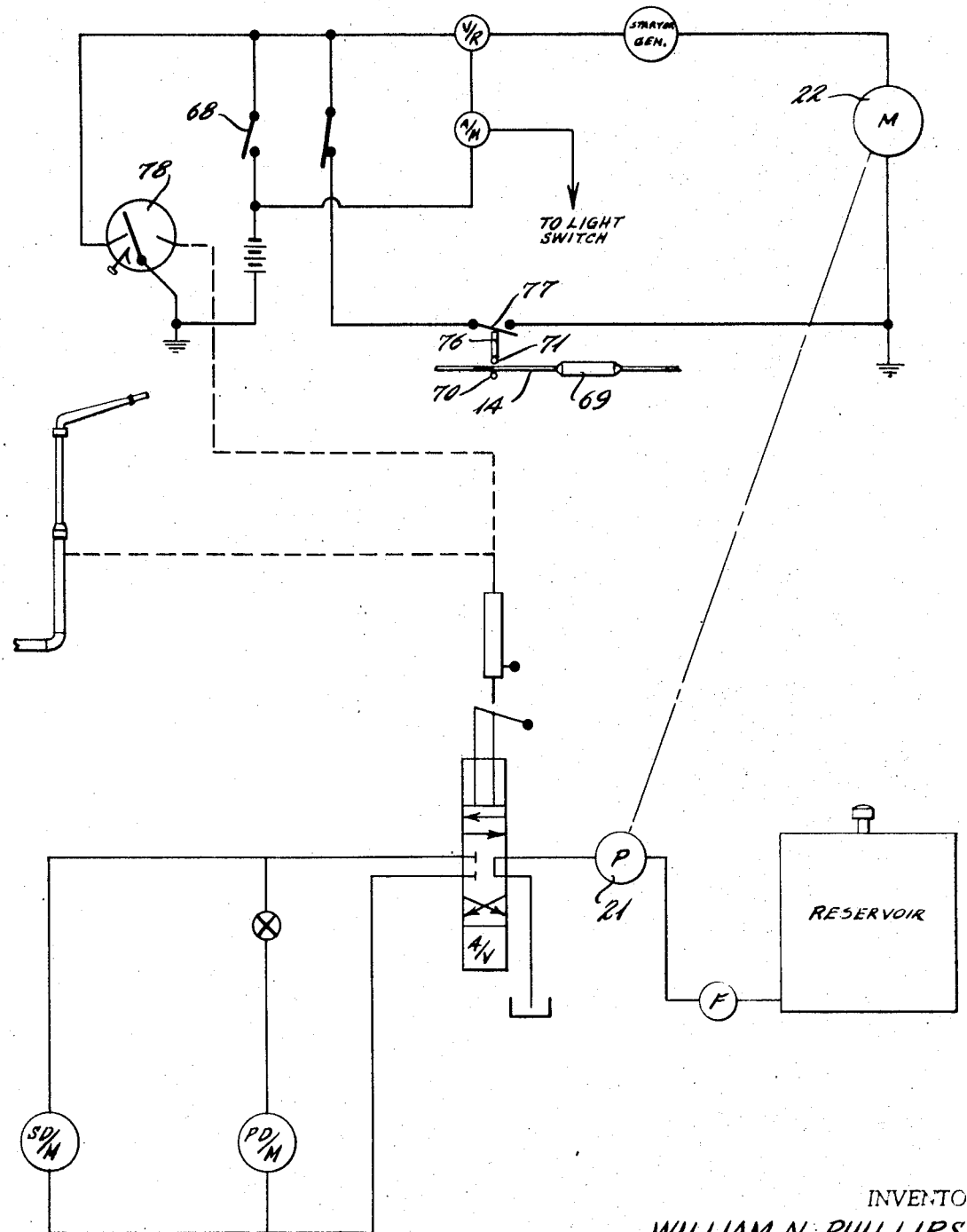
FIG. 10, a schematic of the wiring diagram and the hydraulic system.

Referring to the drawings, in FIG. 1 there are disclosed trees 10 to which it is desired to supply water, and these trees may form part of a grove of citrus or other types of trees. It will be noted that the trees are arranged in rows between which an irrigation machine 11 is adapted to travel, and such machine is supplied with water through a flexible hose or waterline 12 from a header 13. The header 13 receives water under pressure from a pump (not shown) supplied from any desired source, such as a lake, well, or the like.

The irrigation machine 11 is designed to propel itself lengthwise between the rows of trees by means of winding a cable 14 having one end portion attached to a stake 15 and its other end portion extending in multiple coils around a winding drum 16 and idler 17 and onto a storage drum 18. The drums 16 and 18 are driven in any desired manner, as by constant displacement hydraulic motors 19 and 20 from a variable displacement hydraulic pump 21 driven by an internal combustion engine 22. The motor 19 is controlled by a lever 19' and the motor 20 is controlled by a member 20' held in position by a spring 20''. The drive for the drive drum 16 is by means of a gear reduction and gear clutch 23, sprocket 24, chain 25, and sprocket 26 fixed to shaft 27 mounted in pillow blocks 28 on the frame 29 of the machine 11. The drive for the storage drum 18 from the motor 20 is through gear clutch 30, shaft 31, sprocket 32, chain 33 and sprocket 34 fixed to shaft 18' mounted in pillow blocks 35 on the frame 29.

In order to apply a drag to the storage drum 18 to prevent backlash during unwinding, a brakeshoe 36 is carried by a bracket 37 connected to an arm 38 having one end mounted on a pivot 39 carried by the frame, and its opposite end engaged by one end of a weak tension spring 40. The opposite end of the spring 40 is attached to an eyebolt 41 having its threaded end extending through a bracket 42 and adjustably retained therein by means of nuts 43. Thus the storage drum will be maintained under tension, preventing any undue slack in the cable 14 about the drive drum and idler 16 and 17 when the machine is idle or during unwinding.

The frame of the machine is mounted on front and rear axles 44 and 45, the rear axle being supported on wheels 46 while the front axle 44 has wheels 47 mounted on shafts 48 carried on spindles or pivots 49. The spindles 49 are fixed to rearwardly extending steering arms 50 connected by tie bars 51 to a central channel member 52 (FIG. 6) by means of bolts 53. The midportion of the channel member 52 is swingably connected to the frame 29 by a pivot 54 so that when the channel member is oscillated about the pivot 54 it will cause the tie bar 51 to move endwise and the front wheels to move about their spindles 49.

A guiding tongue 55 is connected to the channel member 52 by means of a horizontal pivot 56 which permits the front end of the guiding tongue to move vertically. To maintain such tongue slightly elevated above the ground and to cause it to glide along the terrain, a pair of runners 57 are mounted beneath the front end of the same.

A tow bar 58 likewise is secured to the front end of the tongue 55 by means of which the vehicle may be towed.

In order to provide for free movement of the cable 14 and cut down on frictional wear, a bracket 59 (FIGS. 3 and 7) is provided at the free end of the tongue 55, and such bracket supports pairs of horizontal and vertical guide rollers 60 and 61 respectively. The front end of the cable 14 is maintained in a definite relation during the movement of the vehicle from one location to another by a hook 62 on the tongue 55 over which the terminal eye 14' of the cable 14 is adapted to be looped. It will be understood, of course, that during the operation of the machine such eye 14' will be looped over a stake 15.

In order to provide fuel for the operation of the internal combustion engine 22, one or more fuel tanks 63 may be provided mounted on brackets 64, one for each side of the machine and attached to the frame.

To distribute water admitted through the flexible hose 12, a standpipe 65 is provided having on its upper end a pivoted discharge nozzle or water gun 65' which can move from side to side to discharge water over the area to be watered. Such standpipe is swingably mounted on a support frame 66 by an upper pivoted bracket 66' clamped to the standpipe and a lower bracket 67 carried by the standpipe 65 and adapted to be connected to lugs 68 on the vehicle frame 29 by pins 68'.

When the machine is not in use, the pins 68' are removed, after which the standpipe can be moved to a generally horizontal position so it rests on an arch or cradle 29' at the front end of the vehicle. In order to operate the machine, it is taken to one edge of the field between rows of trees and headed toward the opposite end. Then the cable 14 is unwound and its terminal eye 14' attached to stake 15 in a position remote from the vehicle. The standpipe is then moved from a generally horizontal to a generally upright position and fastened in place by the bracket 67 and pins 68' after which the hose 12 is connected to the lower end of the standpipe 65 and a pump (not shown) is set into operation to force water under pressure from the source into the hose 12.

In order to start the motor, a starter switch 68 is closed to cause the motor to start. Next the operator opens the valve which allows the fluid from the pump to be supplied to the drive motors 19 and 20. The operator throws in the operating lever 19' to cause the clutch 23 to be engaged, it being unnecessary to throw in the clutch lever 20' since it is already biased by the spring 20''. Operation of the motors 19 and 20 will wind the cable 14 about the drive drum 16 and the storage drum 18. As the machine approaches the stake 15, an enlargement 69 on the cable 14 will engage a pair of generally horizontal rollers 70 and 71 carried by support brackets 73 below the frame 29. The upper roller is mounted on a stub shaft 72 movable vertically in slots 74 of spaced supports 73. As the roller 71 moves upwardly as a result of being engaged by the enlargement 69 on the cable 14, it engages a switch member 76 causing switch 77 to close and thus grounding out the circuit and causing the internal combustion engine 22 to stop.

In the event that the water supply becomes inadequate as the vehicle is moving through the field, additional means is provided for stopping the motors 19 and 20 in the form of a pressure switch 78 which opens when the water pressure is inadequate and stops the motors.

With reference to FIGS. 11–19, a simplified version of the apparatus is provided including a vehicle 90 having a guide tongue 91 with a tow bar connection 58 at one end and with diverging arms 93 connected to the tow bar connection and extending rearwardly therefrom. A pair of downwardly extending brackets 59 for supporting the horizontal and vertical guide rollers 60 and 61, as well as the runners 57, are mounted on the connection 58, as previously described. The opposite ends of the arms 93 are connected by horizontally disposed pivots 94 to brackets 95 carried by an auxiliary frame 96 in a manner to permit the tongue 91 to swing in a vertical direction only.

The auxiliary frame 96 includes generally upright side members 97, to which the brackets 95 are attached, and such side members are connected by an upper crossbar 98 and an intermediate crossbar 99. A front axle 100 is welded or otherwise attached to the lower portions of the side members 97 and such front axle is supported by ground-engaging wheels 101. A pivot or connecting pin 102 is mounted between the upper crossbar 98 and the intermediate crossbar 99 and is adapted to connect the auxiliary frame 96 to a main frame 103.

The main frame includes a generally vertically disposed sleeve 104 rotatably mounted about the pivot 102 and such sleeve is connected to a pair of side members 105 having outwardly and rearwardly tapered front portions 106 and spaced generally parallel rear portions 107. The rear portions 107 are connected by a rear crossbar 108.

An upright mast 110 including side members 111 connected at their lower ends by a base 112 and at their upper ends by a crossbar 113, is welded or otherwise attached to the rear portions 107 of the main frame 103. Between the side members 111, an upright standpipe 114, which is generally rectangular in cross section, is welded or otherwise attached to the rear crossbar 108 of the main frame. Preferably a brace 115 extends from the front portions 106 of the main frame upwardly and rearwardly and is welded or otherwise attached to the upper portion of the standpipe 114.

Extending rearwardly from the lower portion of the standpipe 114 is a water inlet pipe 116 having a bracket 117 welded or otherwise attached thereto, and such bracket is mounted on a rear axle 118 supported by ground-engaging wheels 119. Extending upwardly and forwardly from the inlet pipe 116 is a bypass line 120 having one end in communication with the water inlet pipe and the opposite end in communication with the standpipe 114. A control valve 121 is disposed within the bypass line 120 for a purpose which will be described later. The flexible hose 12 is connected to the water inlet pipe to supply water under pressure thereto from a pump (not shown).

The upper end of the standpipe 114 terminates in a flange 124 adapted to be connected in any desired manner, as by bolts 125 or the like to a cooperating flange 126 fixed to one end of an upright pipe 127. The discharge nozzle or water gun 65' is mounted on the upper end of the pipe 127 and is adapted to oscillate from side to side while discharging water.

The upright pipe 127 is adapted to be swingably mounted to the crossbar 113 of the upright mast 110 to permit the upright pipe 127 to be separated from the standpipe 114 and folded to the dotted line position in FIG. 12 when not in use and retained in such position by a flexible rope or bridle 128. The upright pipe has a transverse sleeve 129 welded or otherwise attached thereto and such sleeve is of a size to receive a pin 130 by which the pipe is pivotally mounted to the mast. In order to separate the flanges 124 and 126, the opposite ends of the pin 130 are received within slotted brackets 131 mounted on the crossbar 113 in such a manner that the pin 130 and upright pipe 127 can be moved upwardly slightly so that when the pipe 127 is swung from a generally vertical to a generally horizontal position, the flange 126 will clear the flange 124.

In order to propel the vehicle, a driving reel or drum 132 is mounted on a shaft 133 carried by bearings 134 mounted on the rear portions 107 of the main frame. The drum is adapted to be rotated so that the cable 14 will be wound thereon. The drive means for the drum includes a sprocket 135 driven by a chain 136 from a drive sprocket 137 fixed on one end of a shaft 138 which is rotatably mounted in bearings 139 carried by brackets 140 supported by the main frame 103. The shaft 138 has a sprocket 141 fixed to the opposite end which is driven by a chain 142 from a drive sprocket 143 fixed to a shaft 144 extending outwardly from a gearbox 145. Such gearbox is supported in any desired manner, as by brackets 146 mounted on a plate 147 fixed to the standpipe 114.

A splined drive shaft 148 extends from the gearbox 145 through an opening 149 in the plate 147 and an opening 150 in the standpipe 114 into the interior of the standpipe generally in alignment with the water inlet pipe 116. A splined sleeve 151 is axially slidably mounted on the drive shaft 148 and such sleeve is provided with an impeller 152 fixed at the end remote from the drive shaft. The impeller includes a series of blades or vanes located within the water inlet pipe 116 so that water under pressure passing through the water inlet pipe will impinge upon the blades of the impeller and cause rotation of the drive shaft 148 which in turn will rotate the sprocket 135 and the drum 132.

To increase the efficiency of the impeller, it is desirable that the flow of water passing through the inlet pipe 116 strike the impeller blades at substantially 90°. To direct the water so that the main pressure thrust is at 90° to the impeller blades, a water screw 153 is provided having a central core 154 and helical blades 155 welded or otherwise fixed to the inner periphery of the inlet pipe 116. Water under pressure flowing through the inlet pipe must pass through the water screw 153 and follow a helical path before it is discharged into the standpipe 114. When the water is discharged from the water screw 153, the flow of water will be substantially at right angles to the impeller blades.

The speed of rotation of the impeller 152, and consequently the speed of rotation of the drum 132, is directly related to the pressure of the water passing through the inlet pipe 116 and this can be regulated by opening and closing the control valve 121 in the bypass line 120. When maximum speed is desired, the control valve is closed so that substantially all of the water under pressure must pass through the water screw 153 and drive the impeller 152 at its fastest rate. However, when less speed is required, the control valve 21 can be opened so that some of the water within the inlet pipe will bypass the water screw 153 and therefore the rate of speed of the impeller will be reduced. Preferably a pressure relief valve 156, FIG. 15, is provided within the standpipe 114 to relieve excess pressure therefrom.

A packing gland 157 preferably is disposed about the drive shaft 148 where it passes through the openings 149 and 150. Normally the packing gland 157 is sufficient to prevent leakage around the drive shaft; however, as the pressure within the standpipe increases, the likelihood of leakage through the packing gland likewise increases. To prevent leakage under increased pressure, a pressure plate 158 is rotatably mounted about the sleeve 151 and in engagement with the packing gland 157. Spaced from the pressure plate is a collar 159 bearing against the impeller 152 and freely rotatably mounted about the sleeve 151. A spring 160 is disposed between the pressure plate 158 and the collar 159 so that as the pressure of the water within the inlet pipe 116 increases, the pressure against the impeller blades likewise will be increased, which will move the sleeve 151 axially and move the impeller toward the gearbox 145. As the impeller is moved, the collar 159, which is in engagement therewith, will apply additional pressure through the spring 160 against the pressure plate 158, which in turn will apply additional pressure against the packing gland 157 and thereby form a tighter seal.

When the vehicle approaches the end of the cable 14 and the stake 15, the rotation of the drum 132 must be stopped. In order to do this, the drive shaft 148 extends from the opposite side of the gearbox 145 into a brake assembly 161 carried by a bracket 162 on the gearbox 145. The brakedrum (not shown) of the brake assembly is mounted on the drive shaft 148 and the brakeshoe (not shown) of the brake assembly is disposed closely adjacent to the brakedrum and is pivotally mounted at one end. The free end of the brakeshoe has an operating lever 163 to which one end of a cable 164 is attached. The cable extends upwardly over a pulley 165 and then forwardly over a pulley 166 and downwardly where it is connected to a ring 167 through which the cable 14 is threaded. As the vehicle approaches the end of the cable, the enlargement 69 on the cable engages the ring 167 and pulls the brakeshoe into engagement with the brakedrum so that the drive shaft 148 will be prevented from rotating. When the drive shaft is stopped, the drum 132 likewise will be stopped.

Since the vehicle is relatively lightweight, it may be desirable under certain conditions to increase the weight and therefore the base 112 has been provided with a support member 168 adjacent each end. The outer end of the base and both ends of the support member may be provided with upwardly extending flanges 169 so that a suitable container such as a 55-gallon drum or the like can be filled with water or other relatively heavy material and placed on the base and support members to supply additional weight.

What is claimed is:

1. In a self-propelled irrigating machine having a main frame, a steerable auxiliary frame pivotally connected to the main frame, an upright mast fixed to said main frame, standpipe means swingably connected intermediate its ends to said mast, water spray nozzle means carried at one end of said standpipe means and a water supply hose connected to the opposite end of said standpipe means for supplying water under pressure thereto, the improvement comprising cable reel means rotatably mounted on said main frame, said cable reel means including a winding reel and a storage reel in spaced relation to each other, cable means removably coiled on said storage reel and having at least one turn about said winding reel, one end of said cable means extending outwardly from said machine, means for anchoring said one end of said cable means in a position remote from said machine, means for driving said winding reel and said storage reel at constant speeds, drag brake means associated with said storage reel to prevent slack in the cable about said drive reel, and means carried by said cable means for stopping rotation of said reel means, whereby said winding reel pulls the machine along said cable means at a constant rate and said storage reel takes up the slack in the cable means as it is discharged from said winding reel.

* * * * *